Sept. 21, 1937.                B. A. WITTKUHNS ET AL                2,093,503
                                  ARTIFICIAL HORIZON
                      Original Filed Sept. 11, 1931      4 Sheets—Sheet 1
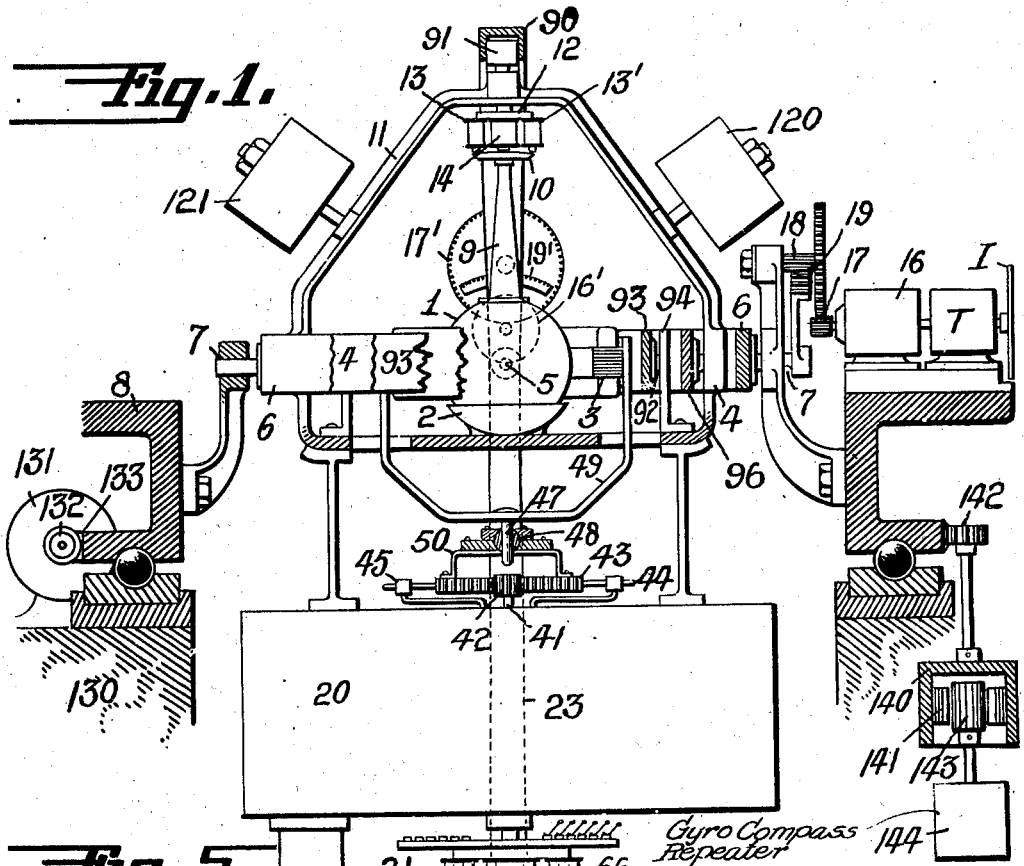
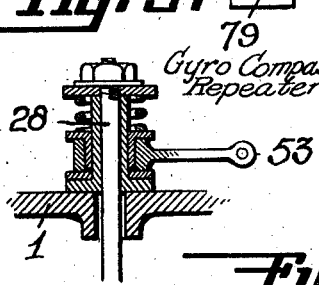
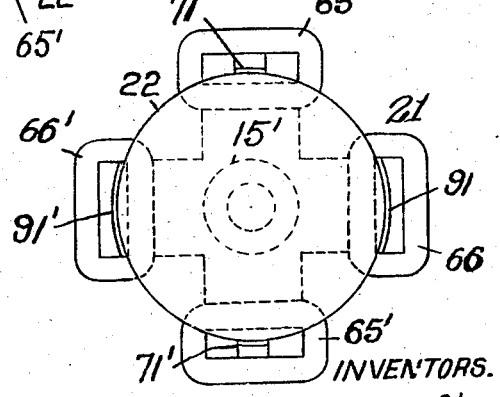
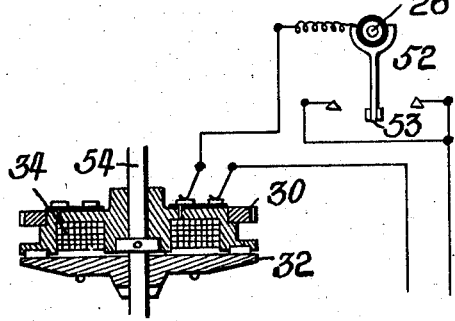
INVENTORS.
BRUNO A. WITTKUHNS
WILLIAM ANSCOTT.
BY Herbert H. Thompson
their ATTORNEY.

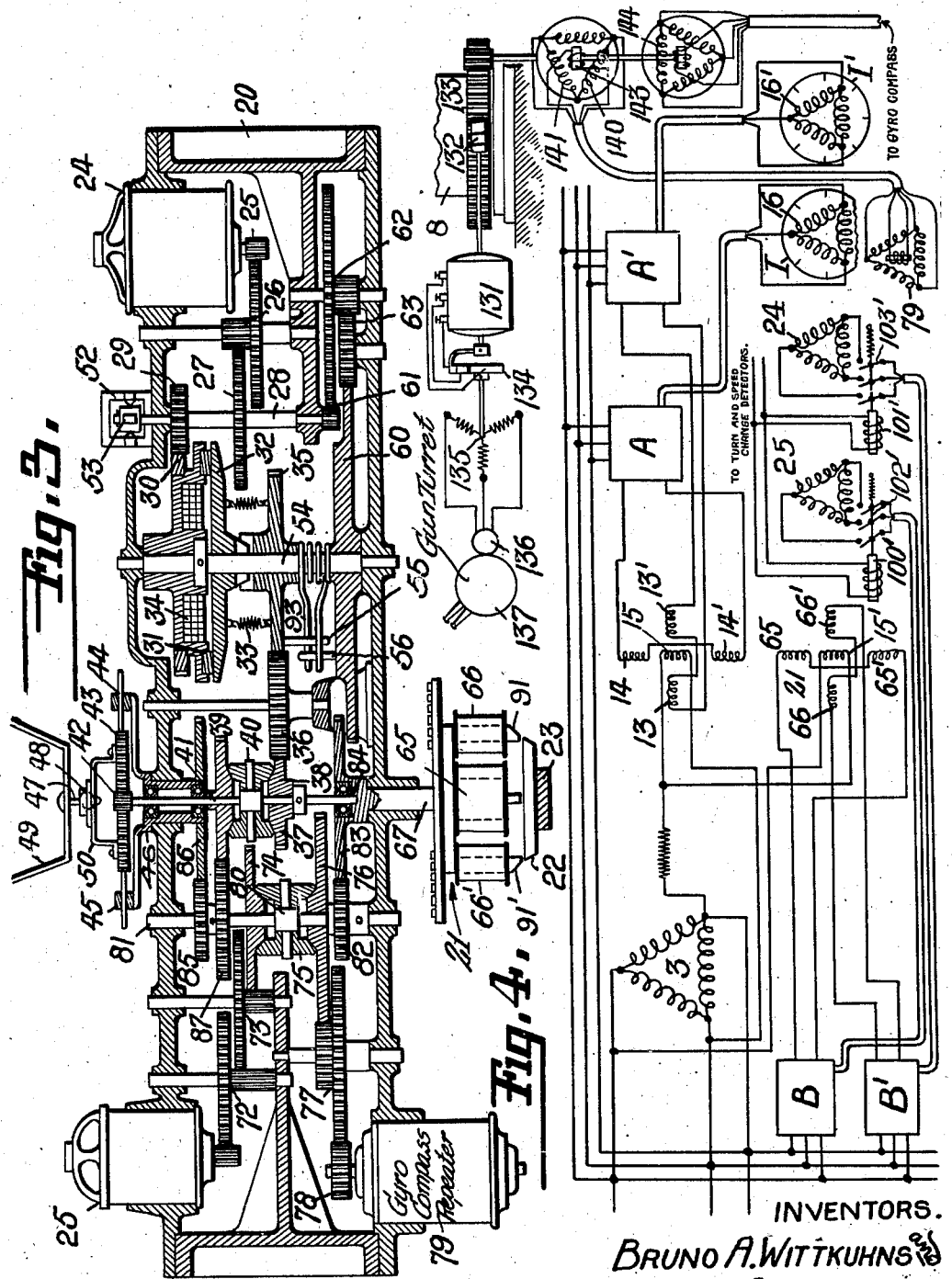

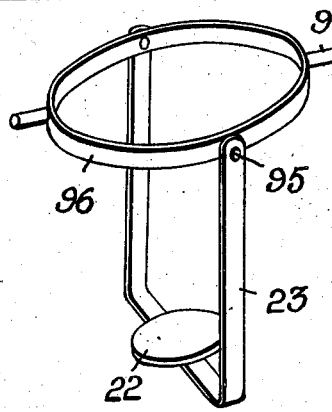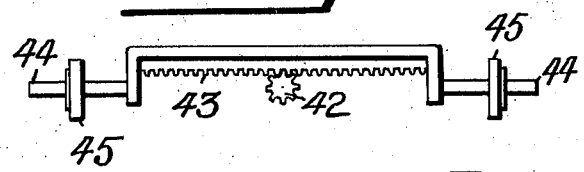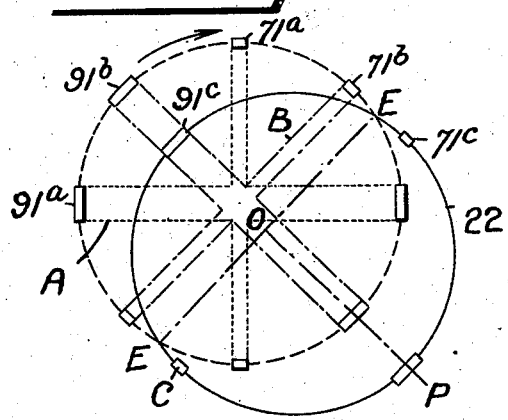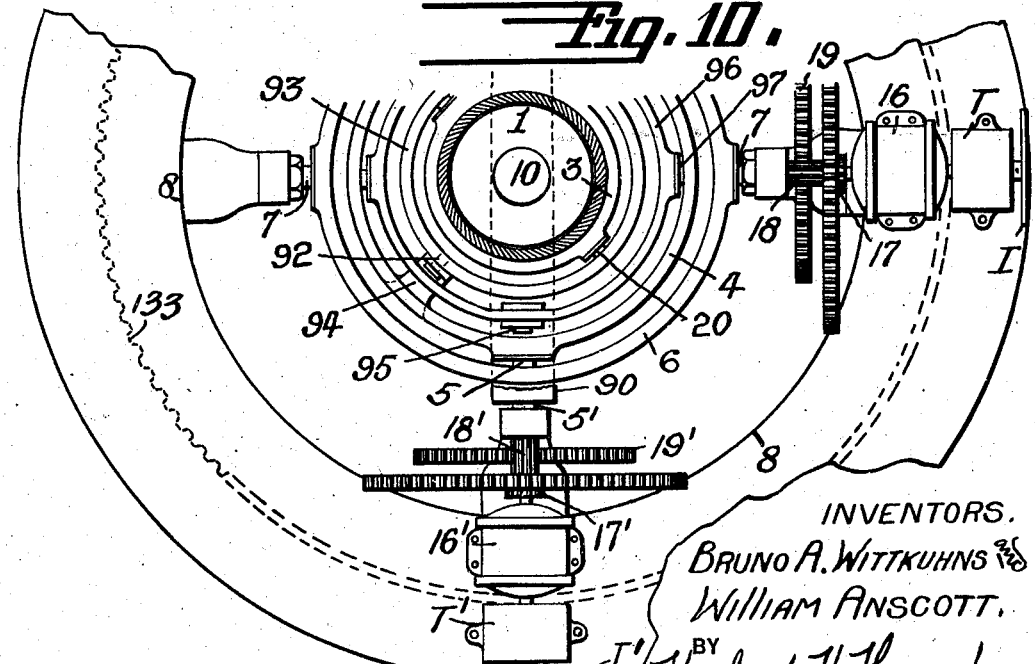

Patented Sept. 21, 1937

2,093,503

UNITED STATES PATENT OFFICE 2,093,503

ARTIFICIAL HORIZON

Bruno A. Wittkuhns, Summit, N. J., and William Anscott, Woodhaven, N. Y., assignors to Sperry Gyroscope Company, Inc., Brooklyn, N. Y., a corporation of New York Application September 11, 1931, Serial No. 562,282
Renewed February 16, 1937

14 Claims. (Cl. 33—204)

This invention relates to gyroscopic apparatus for maintaining a true vertical or horizontal reference plane on unstable objects, such as ships or aircraft, which apparatus is variously known as a gyro vertical or artificial horizon. Our invention relates to a refined, highly accurate type of such apparatus having sufficient accuracy and reliability to be used as a baseline for gunnery purposes or for navigation or other observations on shipboard in the same manner as a gyro compass is used but for maintaining a horizontal plane instead of direction. This apparatus makes it possible to fire the guns automatically and at any desired angle to the horizontal, to automatically compensate for the trunnion tilt of the gun turrets due to the rolling and pitching of the ship and to keep the sights on the target regardless of rolling and pitching.

More particularly our invention is an improvement on the type of gyro vertical disclosed in the prior joint application of Reginald E. Gillmor and Bruno A. Wittkuhns (the latter being one of the present joint inventors), now Patent No. 1,984,874, dated December 18, 1934 for Gyro verticals. By our present invention many of the complications of the prior invention are eliminated by the provision of a means responsive only to repeated tilting of the gyro axis in the same direction which applies a corrective torque of the proper amount and in the proper direction to prevent such tendency to tilt. In other words, by the present invention the continued deviation of the gyro axis from the vertical, due to the earth's rotation, is prevented automatically without the necessity for latitude, course and speed corrections. We have also improved and simplified the means for transferring the tilt from one axis to another when the ship turns. According to our present invention a tilt is put into the means which controls the rotor in one plane only and that tilt is oriented in azimuth when the ship turns so that the tilt remains in the proper plane, which of course is the E—W plane.

Referring to the drawings,

Fig. 1 is a side elevation, partly in section, of our gyro vertical.

Fig. 2 is a bottom plan view of the tilt controller appearing at the bottom of Fig. 1.

Fig. 3 is a vertical section through the corrector of the gyro vertical, the parts being shown in developed arrangement in order that all motors and gears may appear in one figure.

Fig. 4 is a wiring diagram showing how the motors of Figs. 1 and 2 are controlled from the several controllers on the gyro vertical.

Fig. 5 is a detail of a slip friction switch shown at the top of Fig. 3.

Fig. 6 is a wiring diagram showing how the clutch is controlled from the slip friction switch above referred to.

Fig. 7 is a simplified detail showing alone the pendulum controller for the ball.

Fig. 8 is a detail plan view of the connection between the governing mechanism and stator whereby the tilt is imparted to the stator in accordance with the position of the pendulum controller.

Fig. 9 is a diagram illustrating how the pendulum controller governs the position of the ball tilting about one axis only and turns it about the vertical axis, i. e., in azimuth.

Fig. 10 is a plan view of the structure shown in Fig. 1 with parts omitted in order to show the various gimbal ring mountings.

Figure 11:
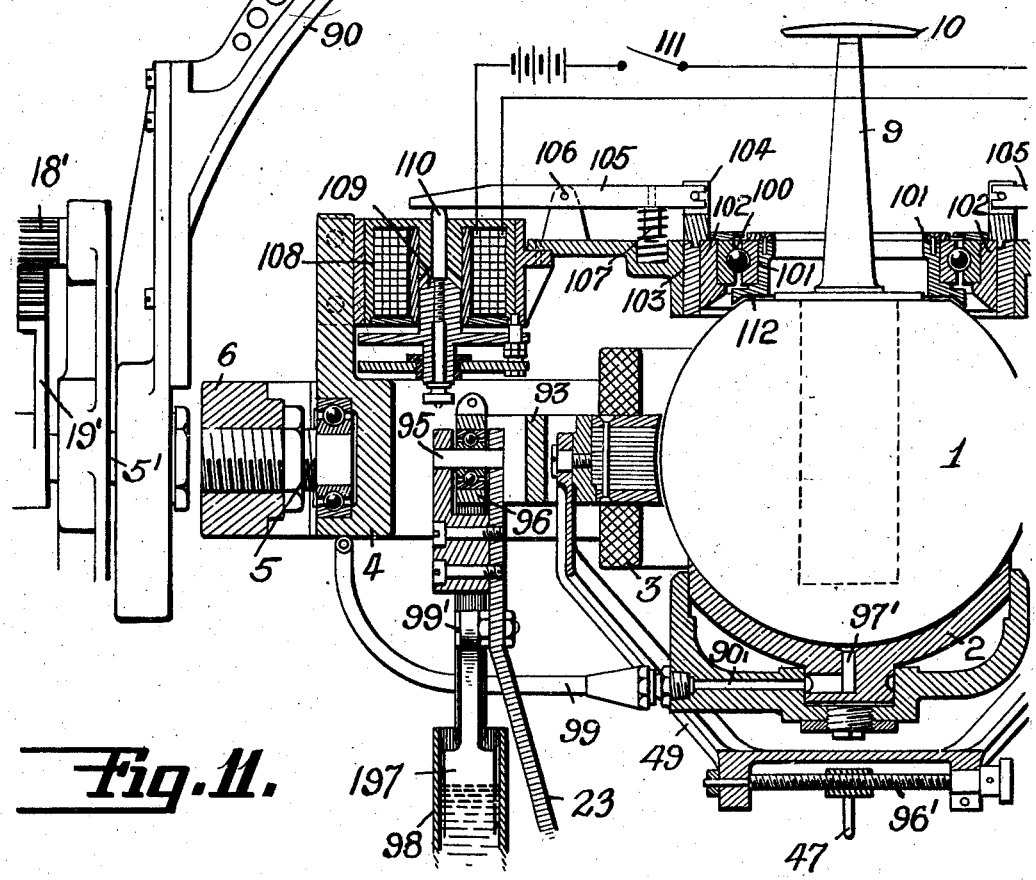
Fig. 11 is a vertical section on a larger scale of a slightly modified form of gyro vertical taken at right angles to Fig. 1, the parts being shown in slightly different position for the sake of illustration.

As in the aforesaid prior invention we prefer to employ as a gyroscopic rotor a ball 1 which is preferably freely floated on a self-generated air film in a cup 2, the gyroscope being spun about a vertical axis by any suitable means such as the stator 3, the ball itself thus forming the rotor of an induction motor. Our present invention, however, is not limited to this form of gyroscope. The cup 2 is mounted in a frame 4 which is universally supported about an axis 5 within gimbal ring 6 which in turn is mounted on trunnions 7 in a support 8 rotatably mounted on base 130. Preferably the axes of the trunnions are maintained parallel to the gun trunnions as by a motor 131 geared by a worm 132 to teeth 133 on the base 8. Power motor 131 is shown as actuated from follow-up reversing contacts 134 driven from a repeater motor 135 actuated from a transmitter 136 on the gun turret 137 (Fig. 4).

Follow-up means are preferably provided to cause the cup to remain centralized under the normally vertical spinning axis of the ball, such follow-up means preferably being made use of to transmit the position of the spinning axis of the ball to a distance. For this purpose there is provided on the ball a hollow stem 9 serving as an indicator of verticality and having at the upper end thereof one element of a two part controller. Preferably a controller of the non-contacting, inductive type is employed with no windings on the ball or sensitive element. To this end there is mounted on the stem 9 a disc 10 of magnetic material. The frame 4 is shown as provided with an upwardly extending loop 11 having suspended therefrom the complementary portion 12 of the controller for detecting relative tilting of the ball and framework. This controller may be of the same form as described in our prior application in which pairs of cross-connected secondary coils in cruciform arrangement 13—13' and 14—14' are symmetrically grouped about a center primary coil 15, the latter being supplied with alternating current (Fig. 4). When the magnetic disc 10 is centrally positioned with respect to all four coils, there will be no E. M. F. generated in the system, but if the disc should be displaced from this position the balance will be disturbed and the output magnified in an amplifier A connected to coils 14—14' (for instance) and thence carried to a suitable power motor 16 operating about axis 7—7 of the frame 4 through suitable reduction gearing 17, pinion 18 and gear sector 19 on trunnion 7. Similarly coils 13—13' operate motor 16' through amplifier A' to turn the frame about axis 5 through the ball or loop 90 pivoted on support 8 on trunnions 5' normally parallel to trunnions 5 (Fig. 11). Loop 90 has the usual sliding connection with loop 11 by means of a roller 91 on the latter, engaging the U-shaped channel in loop 90. By this means the frame 4 and consequently the cup 2 will be caused to follow all movements of the vertical axis of the ball and by placing transmitters T and T' about said axes the position of the gyro vertical may be transmitted for use elsewhere on the ship. Indices I, I' of horizontality may also be provided at the master instrument (Fig. 10).

For aiding in starting up the ball, we prefer to provide an initial centralizing device and also to supply an initial supporting air cushion (see Fig. 11). For the latter purpose the cup 2 is shown as provided with a central aperture 97' connected through passageway 90' to a flexible hose 99 which may be connected to any suitable source of compressed air. This supply, however, may be cut off after the rotor is up to speed. During this speeding up interval, we also centralize the ball by a caging arrangement which may consist of a ball bearing 100, the inner race 101 of which is adapted to be brought into engagement with a flattened portion 112 on the top of the ball so as to hold the same vertical while at the same time permitting rotation of the ball. The outer race 102 is slidably mounted in a frame 103 and has up-standing ears 104 thereon having a pin and slot connection with levers 105 pivoted at 106 on each side. The inner end of each of said levers is normally pushed upwardly by a spring 107 to hold the ball cage out of engagement with the spinning ball 1. When, however, the solenoids 108 are excited by closing starting-switch 111, the cores 109 are drawn upwardly thus raising pins 110 and the outer ends of the levers 105 to force the ball cage into engagement with the gyroscope. As soon as the gyroscopic ball is up to speed, the solenoid 109 will be deenergized as by opening switch 111 and the ball allowed to spin freely.

In order to provide the gyroscope with a self-erecting device, we provide a pendulous means independently mounted from the free gyroscope 1 and preferably so coupled thereto that upon relative inclination of the gyroscope and pendulum a torque is applied to the gyroscope in such a direction as to eliminate directly the tilt. Our preferred method of accomplishing this is to apply such a torque through the driving element or stator 3 by tilting the stator to any desired angle. The stator 3, therefore, is universally mounted within the member 4 by means such as an inner gimbal 93 pivoted on brackets 94 within and carried by member 4 on axis 92 and within which stator 3 is pivoted on an axis 20 at right angles to axis 92. By having a fairly loose coupling between the stator and the gyroscope, the short period oscillations of the pendulum controlling the stator does not disturb the gyroscope but the gyroscope assumes the average vertical position of the pendulum. As the pendulum controller for the ball, we prefer to use an independently mounted pendulum. This is shown in the form of a downwardly extending loop 23, having thereon a disc 22 of magnetic material which may form one element of a two part controller similar to the cruciform controller 10—13—14 above described. Said loop 23 is shown as pivoted on a horizontal axis 95 on a gimbal ring 96 pivoted in turn in trunnions 97 within frame 4. Preferably the pendulum is heavily damped as by means of a paddle 197 secured thereto at 99' and immersed in oil in a relatively fixed dash-pot 98 (Fig. 11) secured to ring 96. A similar damper (not shown) is provided for the pendulum about axis 97.

Unless, however, means are provided to correct for the continued tendency of the gyroscope to become inclined due to the rotation of the earth, the gyro vertical would not be accurate at all times but would be constantly moving away from and being brought back to the vertical. We prefer, therefore, to provide a device which will automatically correct for the earth's rotation and at the same time keep the gyroscope at all times truly vertical. We preferably accomplish this purpose by automatically shifting the center of gravity or tilt of the stator or other position governing means so that the correct torque is continuously applied to the gyroscope to cause it to precess at the proper rate to keep up with the earth's rotation and hence to remain vertical. For this purpose there is shown secured to the frame 4 a box 20 containing a compensating mechanism which is controlled by the relative tilting of the pendulum or disc 22 and the frame 4 which, of course, has the same position as the ball 1. For this purpose we mount on the bottom of the box 20 a cruciform controller 21 which may be in all respects similar to the controller 13—14 above described. The magnetic disc 22 of this controller is supported as above stated on loop 23 forming the pendulum controller. Any relative movement of the disc 22 and the secondary coils 65, 65' and 66, 66' of the cruciform transformer will disturb the balance and operate the connected motors 24—25 through amplifiers B and B'.

Motor 24 is arranged to alter the tilt of the stator in one direction, that is, about one axis, and oppositely to the tilt of the ball axis. For this purpose the motor 24 is shown as having a pinion 25' meshing through reduction gearing 26 with a gear 27 on a shaft 28. On said shaft is mounted a gear 29 which meshes with a larger gear 30 secured to one portion of electromagnetically operated clutch 31. The other face 32 of said clutch is normally drawn out of engagement by tension springs 33 but when the coil 34 is excited the faces are drawn into engagement so that the gear 35 is turned thus turning idler 36 and pinion 37. The latter is shown as forming one arm of a differential gear train 38, the opposite arm being formed by a gear 39 hereinafter described, and the planetary arm 40 turning the central shaft 41. Said shaft carries at its upper end a pinion 42, meshing with a rack 43, slidably supported on trunnions 44 in bearings 45 on arms extending oppositely from a rotatably mounted sleeve 46.

It will readily be seen, therefore, that when the pinion 42 is rotated the rack will be moved to the right or left in Figs. 1 and 3, carrying with it the frame 50. Fixed to the stator and depending therefrom is a loop 49 having a pin 47 adjustably mounted on threaded shaft 96' (Fig. 11) and which extends down through a hole in a ball 48 rotatably mounted in an aperture in the frame 50. Translation of the rack, therefore, when the parts are in the position shown in Figs. 1 and 3, will tilt the stator about an axis parallel to 5, since the frame is held fixed with respect to the ball by the follow-up motors 16 and 16', although balanced about its gimbal axes by counter-weights 120 and 121.

In circuit with the aforesaid clutch 31 is a switch 52, the arm 53 of which has a slip friction connection with the shaft 28 (see Fig. 5). Whenever the shaft 28 starts to turn, therefore, the switch is closed, the electro-magnet excited, and pinion 42 turned. As soon, however, as the turning ceases or starts to reverse, the switch opens and the clutch is deenergized. There is shown a stiff centralizing spring 93 coiled around the shaft 54 and operating between a pin 55 depending from the gear 35 and a relatively fixed pin 56. As soon, therefore, as the clutch is released, the centralizing spring will return the gear 35 to its original position, thus restoring the stator to its original position. This is ordinarily desirable since when the tilt is eliminated it is necessary to immediately remove the torque due to the stator in order that oscillations may be prevented and the ball returned to the vertical in a dead-beat manner.

The centralizing spring 93 also aids in de-energizing the clutch promptly when the motor 24 stops because the centralizing spring puts an opposing torque on the gear train which reaches back to the motor so that the moment the motor coils are deenergized the spring starts to turn the gearing in the other direction thus breaking the switch 53 and deenergizing the clutch.

If no further means were provided than above described, the axis of the ball would be continually tending to deviate from the vertical in a generally westerly direction with an additional component dependent on the latitude. In order to prevent possible errors from this source, we prefer to provide a means for placing a torque on the ball of such magnitude and direction that the ball axis remains vertical at all times, the axis in effect precessing at an equal and opposite rate to the vertical component of the earth's rotation at that point. If attempt is made to compute the amount of the correction to be applied, much complication is involved and according to our invention we generate and apply the proper correction automatically from the tendency of the ball to move away from the vertical. According to the present invention, instead of bringing the stator exactly back to its original vertical position, after each correction is applied, we introduce a slight correction in the position of the stator for each deviating movement of the ball which becomes cumulative until a position of equilibrium is reached. For this purpose the centralizing pin 56 is mounted on the face of a large gear 60 so as to be slowly adjustable. Said gear 60 in turn is driven from the shaft 28 through irreversible, double reduction gearing 61—62 and idler 63 so that when the motor 24 is actuated to turn the gear 25 through a substantial angle or several rotations, the gear 60 will also turn in the same direction a very much less amount. Therefore, when the clutch is released, the gear 25 will not be brought quite back to its original position but will be slightly displaced therefrom, thus leaving the stator with a slight tilt. If the gyro goes off again in the same direction, this process will be repeated and the stator given a slightly greater tilt. However, if the ball goes off in the opposite direction, the tilt of the stator will be eliminated. By this or similar averaging means the correct amount of tilt is placed in the stator to maintain the gyro axis vertical.

So far only the action of the motor 24 has been described. It is obvious that the motor 25 could be made to operate the system about an axis at right angles to the motor 24 in a similar fashion, somewhat as disclosed in our prior joint application. However, according to the present invention we prefer to cause orientation of the tilting system from motor 25 so that the motor 24 imparts the tilt while the motor 25 determines the plane in which the tilt shall be imparted. Since the tendency of the top of the ball is always to move in the E—W plane as stated above, the plane of tilt of the system is also in the E—W plane. Motor 25, however, may be controlled from the coils 65—65' of the controller 22 in exactly the same way that the motor 24 is controlled from the coils 66—66' but the reason why this is so may require some explanation.

Referring to Fig. 2, the disc 22 in the position shown is symmetrically placed with respect to both groups of coils 65 and 66, i. e., symmetrical with respect to their respective cores 71, 71' and 91, 91'. In this position both motors 24 and 25 will obviously not be operated. Now suppose the ball to have become inclined so that disc 22 lies in the full line position of Fig. 9 with respect to the cruciform cores (position A). Considering first the action of motor 25, this motor will orient through gearing hereinafter described, both the stem 67 supporting the cruciform coils and the above described sleeve 46 supporting the arms 44 of the rack 43. This rotation will continue until the dotted line position B is reached, in which position the cores 71b and 91b are symmetrically placed with respect to the disc 22, i. e., until cruciform coils 65 and 65' are parallel to cord E—E connecting the points of intersection of circles A and 22. In order to increase the accuracy of this positioning, each of iron cores 71 and 71' are reduced at their lower extremities to extend down below the rest of the core. In this position the disc is symmetrically placed so that it is obvious that direct relative movement of the disc and coils along a perpendicular O—P to the cord E—E will restore the position of the controller and that this movement may be brought about entirely through the action of the coils 66—66' of cores 91 and 91' on the motor 24. Actuation of motor 24 then tilts the stator until cores 91 and 91' are symmetrically placed around disc 22 (see position C, Fig. 9).

For this purpose the motor 25 is connected through double reduction gearing 72—73 with a gear 74 forming one arm of a differential gear train 75. The opposite arm of said train is formed by a gear 76 driven through reduction gearing 77 from a pinion 78 on the shaft of repeater motor 79. Said motor is actuated indirectly from a gyro compass or other direction indicator. The planetary arm 80 of said gear train drives the shaft 81 geared at the bottom through pinion 82 to a gear 83 on the above mentioned stem 67, thus rotating cruciform coils 65—66 in azimuth. Said stem is shown as also forming a bearing 84 for the bottom of the shaft 41. Shaft 81 also drives the pinion 85 meshing with a gear 86 on the above described sleeve 46 which carries the rack 43. Shaft 81 also turns through gear 87, the above described gear 39 forming a part of the differential gear train 40. The purpose of this last connection is to prevent changes in the azimuthal position of the parts from affecting the tilt due to the rack and pinion connection between the rack 43 and pinion 42, as will be readily apparent.

It will readily be seen, therefore, that whenever a tilt of the ball takes place in any plane whatever, the stator will be oppositely tilted in the same plane due to the novel cooperation of the tilt motor 24 and azimuth motor 25 and the cruciform controller and the reaction of the tilted stator on the ball, the azimuth motor positioning the parts so that the tilt may be corrected for in the proper or E—W plane. It will be understood, however, that both operations take place simultaneously. By employing this method of eliminating the tilt, the matter of correcting for the turning of the ship will take care of itself since rack 43 is positioned in azimuth from the ball, but we prefer, for reasons described hereinafter, to eliminate all pendulous control during turn and, therefore, orient the rack during turning by a connection with a standard gyroscopic compass by bringing in the compass correction directly through differential 75 operating through the same gears that the motor 25 operates through.

It is in order to prevent possible disturbance of the ball during turning or changes of speed of the ship, causing a temporary displacement of the pendulum in one direction as distinguished from the short period oscillations due to rolling and pitching, that we prefer to provide means for temporarily eliminating all pendulous influence on the ball during this time. Any suitable form of turn and change speed detectors may be employed for bringing our cut-out means into operation, such as shown in the patent to Herbert H. Thompson, No. 1,773,412, dated August 19, 1930, or in the patent to Leslie F. Carter, No. 1,730,967, dated October 8, 1929 for Turning error preventor for gyro compasses, the standard naval compasses now being equipped with a turn detector device, such as shown in the Carter patent. We, therefore, place in circuit with the turn cut-out switch on the compass a pair of solenoids 100'—101', which when excited open the main switches 102' and 103' of the motors 24 and 25. As a result no disturbance reaches the ball from the temporary deviation of the pendulum 22. As soon as the acceleration has ceased, the solenoids are automatically deenergized and the switches again closed.

As stated above, one of the principal uses for a gyro vertical on a warship is for determining the trunnion tilt correction for the guns which, of course, is a function of the position of the gun's trunnion axis with respect to the ship as well as a function of the roll or pitch of the ship at the time of firing. Therefore, it is desirable that one of the transmitters T or T' transmit the inclination of the gun's trunnion axis to the trunnion tilt correction device so that it is necessary to maintain one of the trunnion axes of the gyro vertical parallel with the trunnion axis of the gun.

While motor 79 is controlled from the compass, since it is on rotatable platform 8 turned from the gun 137, it is necessary that motor 79 be jointly controlled by these two factors. To this end, repeater motor 79 is shown as actuated from an A. C. transmitter 140, the field 141 of which is turned from gear 133 on platform 8 through pinion 142 (Figs. 1 and 4) while the armature 143 is turned from a gyro compass A. C. repeater 144.

From the foregoing the operation of our invention will be readily apparent. Once the device has located the plane of and generated the proper correction for the tilt of the stator it will operate with very little actuation of the motors 24—25 since the compass motor 79 will maintain the parts fixed in azimuth regardless of turning of the ship. The motor 25 especially will not be called upon to operate much because having determined the plane of deviation of the ball axis i. e. the E—W plane, the compass motor will maintain this plane indefinitely. On the other hand, by our novel tilt corrector, the stator is given just the proper amount of counter-tilt to maintain the ball vertical in spite of the rotation of the earth. The ball itself, however, is controlled only indirectly by gravity so as to be free from disturbances due to rolling and pitching, and all acceleration disturbances are eliminated by severing all gravitational control during periods of acceleration (turns or speed changes) of the ship.

It is also interesting to note that our gyroscopic apparatus is not only adapted to indicate the position of the vertical but also position in azimuth, that is, direction, since the plane in which the ball tends to tilt, namely, the E. W. plane, is determined by the cruciform controller and a portion of the device oriented into this plane (in this instance the rack bar 43). Said bar, therefore, will always lie E—W and may, if desired, be used as an indicator of direction or compass. As far as this aspect of the invention is concerned, the connection to the standard gyroscopic compass through compass repeater motor is not necessary since the device will indicate direction without assistance from another compass but would be somewhat slow in orienting itself after a turn of the ship according to the design disclosed in this application. It would, however, possess several important advantages over a standard gyroscopic compass due to the fact that the gyro element itself possesses three degrees of freedom, i. e., is neutral about all axes so that the gyro element itself is undisturbed by acceleration forces of any character.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a gyroscopic artificial horizon, a gyroscopic rotor, means for universally supporting the same in neutral equilibrium with a normally vertical spinning axis, independently supported means for spinning the rotor having a self-aligning driving coupling therewith, means for pendulously controlling said spinning means including a pendulum controller, means responsive to relative inclination of the rotor axis and controller in one plane for giving the spinning means a countertilt in that plane, and means responsive to relative inclination of the rotor axis and controller in a plane at right angles to said first mentioned plane for orienting said stator tilting means into the plane of tilt of the rotor axis.

2. In a gyro vertical, the combination with a universally mounted free gyroscope, of a platform stabilized thereby a pendulum controlled means for erecting said gyroscope including a revoluble and laterally shiftable coupling between said platform and gyroscope adapted to apply a torque on the gyroscope upon relative inclination of said pendulous means and platform to cause direct elimination of tilt, and means responsive to continued tilting in the same direction for laterally shifting said coupling in the plane of tilt to exert a continuous torque after the gyroscope becomes vertical.

3. An artificial horizon for ships comprising a ball-like rotor, a cup for supporting the rotor and furnishing the bearing therefor, a universal support for said cup, a stator around the rotor for spinning the same, an independent universal support for the stator, means for laterally shifting the center of gravity of said stator in one plane only about an axis to vary the inclination thereof, and means for orienting said shifting means to orient the plane of inclination.

4. In an artificial horizon having a gyroscope, a gyroscopic rotor, means for universally supporting the same in neutral equilibrium with a normally vertical spinning axis, universally and independently supported spinning means for the rotor having a self-aligning driving coupling therewith, means for pendulously controlling said spinning means, a pendulum controller, means responsive to relative inclination of the rotor axis and controller in one plane for actuating said controlling means to tilt the spinning means in that plane, means responsive to relative inclination in a plane at right angles to said first named plane for orienting said controlling means to orient the plane in which the tilting of said spinning means is caused, and compass controlled means for actuating said controlling means to maintain such plane regardless of the turning of the ship.

5. In a ball gyroscope, the combination with the ball having a flattened surface on one side, a freely rotatable member adapted to engage said surface to centralize the ball without interfering with its rotation, a ring in which said member is journalled, and means for moving said ring toward and away from said ball to centralize and free the ball.

6. In a ball gyroscope, the combination with the ball having a flattened surface on one side, a freely rotatable member adapted to engage said surface to centralize the ball without interfering with its rotation, a support in which said member is journalled, and a plurality of symmetrically disposed electro-magnetic means for moving said support and member toward and away from the ball to centralize and free the ball.

7. In gyroscopic positional apparatus for ships, a gyroscope mounted with three degrees of freedom and with its spinning axis at a substantial angle to the horizontal, means for applying a torque thereto about a horizontal axis upon change in tilt of said spinning axis about a second horizontal axis lying at right angles to said first mentioned axis, orienting means for changing the vertical plane in which said torque is applied to change the torque axis position, pendulous means for bringing said torque means into action and for controlling said orienting means upon change in tilt of said spinning axis about said first-named tilt axis.

8. In a gyro vertical, the combination with the rotor, means for spinning the same about a normally vertical axis, means for mounting said spinning means for universal tilting independently of said rotor, an independent pendulous means for controlling the position of said spinning axis, including means responsive to relative inclination of the rotor axis and pendulous means for giving the spinning means a counter-tilt in the plane of the axis tilt, and averaging means responsive to continued preponderance of tilting in the same direction for actuating said tilting means to maintain a tilt in the spinning means after the gyroscope becomes vertical, whereby the tilting effect of the earth's rotation on the position of the gyroscope is eliminated.

9. In a gyro vertical, the combination with a universally mounted free gyroscope, of a pendulum controlled means for erecting said gyroscope including a revoluble and laterally shiftable coupling between said means and gyroscope adapted to apply a torque on said gyroscope upon inclination of said gyroscope to cause direct elimination of tilt, averaging means responsive to continued proponderant tilting in the same direction for laterally shifting said coupling in the plane of tilt to exert a continuous torque after the gyroscope becomes vertical, and means for temporarily rendering said shifting means inoperative during acceleration of the ship.

10. In a gyro vertical, the combination with the rotor, a universal support for the same, independent universally mounted means for spinning said rotor about a normally vertical axis, an independent pendulous means for controlling said spinning means to thereby control the position of said rotor axis, means responsive to relative inclination of the rotor axis and pendulous means for relatively adjusting the pendulous means and spinning means to give the spinning means a countertilt independent of said support and in the plane of the tilt of said rotor axis, and means responsive to accelerations of the carrying craft for rendering said relative adjusting means inoperative during such acceleration.

11. In gyroscopic positional apparatus for ships, a gyroscope mounted in neutral equilibrium with three degrees of freedom and with its spinning axis at a substantial angle to the horizontal, pendulous means for detecting tilt of said gyroscope in any direction, erecting means controlled by relative tilt of said pendulous means and gyroscope in one plane for applying a countertorque thereto in that plane, and turning means controlled by the relative tilt of said pendulous means and gyroscope in a plane at right angles to said first mentioned plane for turning said torque means into the plane of said tilt.

12. In gyroscopic positional apparatus for ships, a gyroscope mounted with three degrees of freedom and with its spinning axis substantially vertical, a reference pendulum, means for applying a torque to said gyroscope about a horizontal axis upon change in relative tilt of said gyroscope and pendulum in one plane, means for orienting the vertical plane in which said torque is applied to change the torque axis position upon relative tilt of said gyroscope and pendulum in a plane at right angles to the first named plane, and compass controlled means for maintaining the plane of said torque means east–west when the ship turns.

13. In a gyro-vertical, a neutral, universally mounted gyroscope, a universally mounted pendulous device, means responsive to relative inclination of said gyroscope and device for exerting a torque on the gyroscope in a direction to directly eliminate the inclination, means for adjusting the relation between said gyroscope, the pendulum and said torque means in accordance with the latitude to compensate for the tilting effect on the gyroscope of the earth's rotation, and means for orienting said adjusting means to maintain E—W the plane of said adjustment.

14. In a gyro-vertical, a neutral, universally mounted gyroscope, a universally mounted pendulous device, means responsive to relative inclination of said gyroscope and device for exerting a torque on the gyroscope in a direction to directly eliminate the inclination, means causing a small part of said torque to act continuously in one direction to compensate for the tilting effect of the earth's rotation, and compass controlled means for orienting said last named means to maintain said compensating torque in the E—W plane.

BRUNO A. WITTKUHNS.
WILLIAM ANSCOTT.